UNITED STATES PATENT OFFICE.

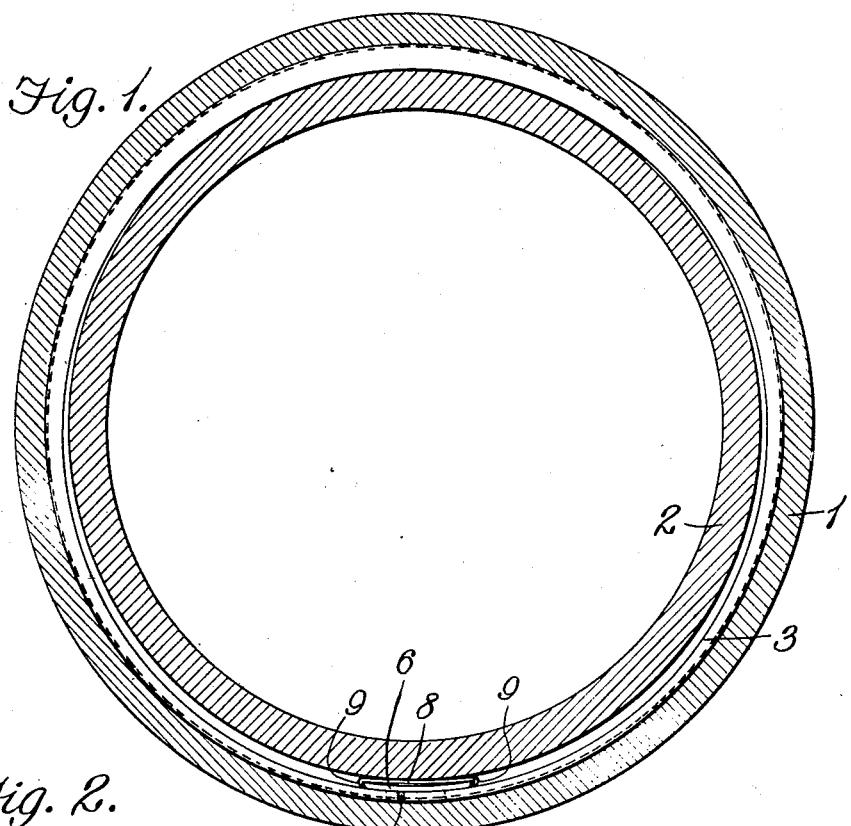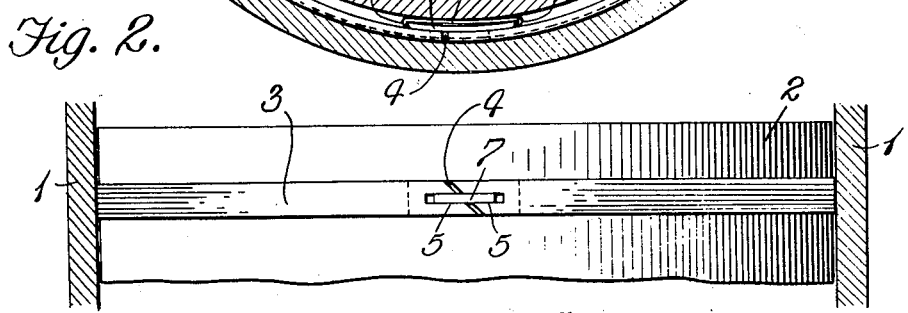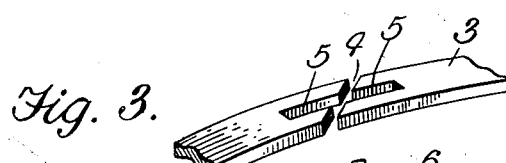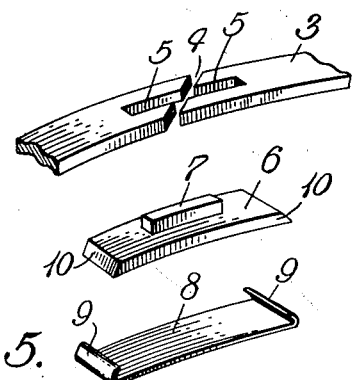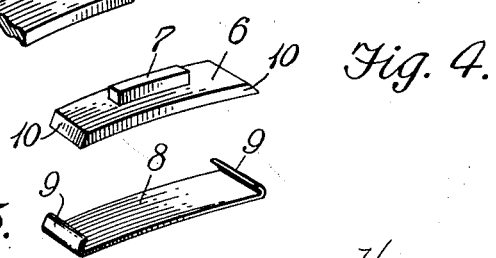

HARRY MAGEE, OF DETROIT, MICHIGAN.

PISTON-RING.

1,098,121.   Specification of Letters Patent.   Patented May 26, 1914.

Application filed December 11, 1913. Serial No. 806,029.

*To all whom it may concern:*

Be it known that I, HARRY MAGEE, a citizen of the United States of America, residing at Detroit, in the county of Wayne and State of Michigan, have invented certain new and useful Improvements in Piston-Rings, of which the following is a specification, reference being had therein to the accompanying drawings.

In the construction of packing rings for pistons it is advisable that means be provided for holding the abutting ends, if the ring be of the split type outwardly against the cylinder wall in addition to the natural tendency of the ring itself to spread outwardly, as the thin end portions are not always capable of remaining against the wall under certain working conditions.

This invention relates to a piston ring of the split type and to an arrangement thereof whereby the split and tapered end portions are yieldingly forced against the wall of the cylinder regardless of the angular position of the ring ends on the piston, and by a member that does not interfere with the creeping of the ring and therefore materially assists in preventing any cutting or grooving either of the ring or of the cylinder wall.

The invention consists in the matters hereinafter set forth and particularly pointed out in the appended claims.

In the drawings, Figure 1 is a view in transverse section of a cylinder and piston equipped with a piston ring that embodies features of the invention; Fig. 2 is a view in side elevation of the piston and ring with the cylinder walls shown in section; Fig. 3 is an enlarged view in detail of the end portion of the ring; Fig. 4 is a view in detail of filler member; and Fig. 5 is a view in detail of a filler member spring.

Referring to the drawings, a cylinder 1 with piston 2 the latter having the usual annular piston ring groove, coöperate to confine a piston ring 3 that is formed in the usual manner with its interior face eccentric to the exterior and with a transverse, and in this instance, oblique cut indicated at 4 through its thinnest portion. The resultant yielding end portions are correspondingly slotted longitudinally as indicated at 5.

A filler plate has a body 6 that is adapted to bear against the inner peripheries of the end portions of the ring, a projection or lug 7 engaging with the slots 5 and holding the member in place. The lug is of such dimensions in relation to the slot that it has limited longitudinal movement therein even when the ring ends are closely abutted. A spring member 8 is formed of suitable material such as brass, copper or the like with its end portions 9 infolded or otherwise adapted to hook from the beveled ends 10 of the plate 6, the plate and spring being of such proportions that the middle portion only of the outer face of the spring bears against the adjacent periphery of the piston and thereby yieldingly forces the ring outwardly into positive contact with the cylinder wall.

Because of the peculiar disposition of the plate in its interlocked relation with the end portions of the ring, a joint is obtained that seals against the passage of steam or gas along the oblique cut between the ring ends. The spring member not only holds the filler plate in unlocked relation with the ends and with the outer face of the filler plate lug in sliding contact with the cylinder wall, but also yieldingly maintains the end portions of the ring in operative contact with the cylinder. Because of the disposition of the spring, the ring is free to creep around the piston and this eliminates the tendency of the ring to remain in one place and cut or groove the cylinder.

Obviously, changes in the details of construction may be made without departing from the spirit of my invention and I do not care to limit myself to any particular form or arrangement of parts.

What I claim is:—

1. A packing ring for pistons that is transversely split and is longitudinally slotted at that point, a filler plate interlocking with the slottted ends of the ring and bearing against the inner face of the latter and a bowed spring member in compression between the filler member and the piston and having its ends detachably held by the ends of said filler plate.

2. A packing ring for pistons that is transversely split and is longitudinally slotted at that point, a filler plate interlocking with the slotted ends of the ring and bearing against the inner face of the latter and a spring member detachably interlocked with the end portions of the filler member and bowed and adapted to yieldingly bear against a piston wall with its outer face.

3. The combination of a cylinder and piston therefor, of a split packing ring seated in the peripheral groove of the piston, the resultant end portions being longitudinally slotted, a filler member interlocking with the slotted end portions and lying between the piston and the latter, and a bowed spring member detachably retained in engagement with the end portions of the filler member by its own resiliency and lying between the piston and the member in frictional engagement with the piston.

4. The combination with a piston having a peripheral groove and a split ring arranged in said groove, of resilient means having a bearing on the bottom of the groove and a pressure engagement with the split ends of said ring capable of simultaneously holding said ring expanded and the ends thereof against lateral displacement relatively to one another.

5. The combination with a cylinder and piston therefor having a peripheral groove, of a split piston ring, the end portions thereof having a longitudinal slot, a filler plate having a lug interlocking with the slotted end portions of the ring and movable longitudinally thereof and a spring member having undercut end portions that interlock with the correspondingly shaped end portions of the filler plate, the middle portion of the spring member being bowed and adapted to yieldingly bear against the bottom of the piston groove.

In testimony whereof I affix my signature in presence of two witnesses.

HARRY MAGEE.

Witnesses:
C. R. STICKNEY,
A. M. DORR.